US006748438B2

(12) United States Patent
Palmer et al.

(10) Patent No.: US 6,748,438 B2
(45) Date of Patent: *Jun. 8, 2004

(54) METHOD AND APPARATUS FOR ACCESSING SHARED RESOURCES WITH ASYMMETRIC SAFETY IN A MULTIPROCESSING SYSTEM

(75) Inventors: John Davis Palmer, San Jose, CA (US); Hovey Raymond Strong, Jr., San Jose, CA (US); Eliezer Upfal, Providence, RI (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,276

(22) Filed: Nov. 17, 1997

(65) Prior Publication Data

US 2002/0016845 A1 Feb. 7, 2002

(51) Int. Cl.[7] .............................................. G06F 15/16
(52) U.S. Cl. ...................... 709/229; 709/220; 709/222; 709/221; 713/201
(58) Field of Search ................................ 709/220, 221, 709/201, 208, 209, 229, 223, 224; 713/200, 201; 714/11, 12, 5, 43; 370/254

(56) References Cited

U.S. PATENT DOCUMENTS

| | | | |
|---|---|---|---|
| 4,864,559 A | 9/1989 | Perlman | 370/60 |
| 5,079,767 A | 1/1992 | Perlman | 370/94.3 |
| 5,243,596 A | 9/1993 | Port et al. | 370/94.1 |
| 5,317,749 A | 5/1994 | Dahlen | 395/725 |
| 5,339,443 A | 8/1994 | Lockwood | 395/725 |
| 5,355,371 A | 10/1994 | Auerbach et al. | 370/60 |
| 5,392,433 A | 2/1995 | Hammersley et al. | 395/725 |
| 5,392,434 A * | 2/1995 | Bryant et al. | 710/244 |
| 5,414,856 A | 5/1995 | Yokota | 395/725 |
| 5,463,733 A | 10/1995 | Forman et al. | 395/182.08 |
| 5,467,352 A | 11/1995 | Cidon et al. | 370/85.5 |
| 5,502,840 A | 3/1996 | Barton | 395/726 |
| 5,513,354 A | 4/1996 | Dwork et al. | 395/650 |
| 5,519,704 A | 5/1996 | Farinacci et al. | 370/85.13 |
| 5,550,973 A | 8/1996 | Forman et al. | 395/182.03 |
| 5,612,959 A | 3/1997 | Takase et al. | 370/390 |

(List continued on next page.)

OTHER PUBLICATIONS

D, Malki et al., "Uniform Actions in Asynchronous Distributed Systems," Proceedings of the 13th Annual SCM Symposium on Principals of Distributed Computing, 1994, pp. 274–283.

(List continued on next page.)

Primary Examiner—Ario Etienne
Assistant Examiner—Abdullahi E. Salad
(74) Attorney, Agent, or Firm—McGinn & Gibb, PLLC; Mark C. McCabe, Esq.

(57) ABSTRACT

In a multiprocessing system, access to a shared resource is arbitrated among multiple computing nodes. The shared resources has a membership view resulting from a predetermined membership protocol performed by the shared resource and the computing nodes. Preferably, this membership protocol includes a termination condition guaranteeing asymmetric safety among all members of the multiprocessing system. The shared resource arbitrates access to itself by fencing computing nodes outside shared resource's membership view. In one embodiment, the shared resource may comprise a data storage facility, such as a disk drive. Illustratively, computation of the shared resource's membership view may employ a procedure where each computing node subscribes to the resource during prescribed membership intervals.

26 Claims, 10 Drawing Sheets

U.S. PATENT DOCUMENTS

| | | | | |
|---|---|---|---|---|
| 5,623,670 | A | | 4/1997 | Bohannon et al. .......... 395/726 |
| 5,634,011 | A | | 5/1997 | Auerbach et al. ...... 395/200.15 |
| 5,682,470 | A | | 10/1997 | Dwork et al. ............ 395/182.1 |
| 5,692,120 | A | * | 11/1997 | Forman et al. ................ 714/10 |
| 5,893,116 | A | * | 4/1999 | Simmonds et al. .......... 707/201 |
| 5,948,078 | A | * | 9/1999 | Joffe .............................. 710/9 |
| 6,279,032 | B1 | * | 8/2001 | Short et al. .................. 709/209 |
| 6,308,199 | B1 | * | 10/2001 | Katsurabayashi ........... 709/204 |

OTHER PUBLICATIONS

K. Berman et al., "Reliable Distributed Computing with the Isis Toolkit," IEEE Computer Society Press, Los Alamitos, CA, 1994.

MPI: A Message–Passage Interface Standard, published by the Univ. of Tennessee, 1994.

M. Rosu et al., "Early–Stopping Terminating Reliable Broadcast Protocol for General–Omission Failures", *Proceedings of 15th ACM Symposium on Principles of Distributed Computing*, 1996, p. 209.

D. Dolev et al., "A Framework for Partitionable Membership Service", Technical Report TR 94–6, Department of Computer Science, Hebrew University.

F. Jahanian et al., "Processor Group Membership Protocols: Specification, Design and Implementation" in *Proc. of 12th IEEE Symposium on Reliable Distributed Systems*, pp. 2–11–1993.

R. van Renesse et al., "Horus: A Flexible Group Communication System", *Comm. of the ACM*, vol. 39, No. 4, pp. 76–83, 1996.

M. Aguilera et al. "Randomization and Failure Detection: A Hybrid Approach to Solve Consensus", *Proceedings of 10th International Workshop on Distributed Algorithms*, Italy 1996, pp. 29–39.

M. Herlihy et al., "Set Consensus Using Arbitrary Objects", *1994 ACM*, pp. 324–333.

D. Dolev et al., "On the Minimal Synchronism Needed for Distributed Consensus", *Journal of the ACM 34(1)*, 1987, pp. 77–97.

G. Bracha et al., "Asynchronous Consensus and Broadcast Protocols", *Journal of the Association for Computing Machinery*, vol. 32, No. 4, Oct. 1985, pp. 824–840.

T. Chandra et al., "The Weakest Failure Detector for Solving Consensus", *Proc. 11th ACM Symposium on Principles of Distributed Computing*, 1992, pp. 147–158.

D. Peleg, "Crumbling Walls: A Class of Practical and Efficient Quorum Systems", *Proc. 14th ACM Symposium on Principles of Distributed Computing*, 1995, pp. 120–128.

M. Fischer et al., "Impossiblity of Distributed Consensus with One Faulty Process", *Journal of the Association for Computing Machinery*, vol. 32, No. 2, Apr. 1985, pp. 374–382.

C. Dwork et al., "Collective Consistency", *Proceedings of 10th International Workshop on Distributed Algorithms*, Italy 1996, pp. 234–250.

T. Chandra, "On the Impossibility of Group Membership", *Proceedings of 15th Annual ACM Symposium on Principles of Distributed Computing*, May 1996, pp. 322–340.

* cited by examiner

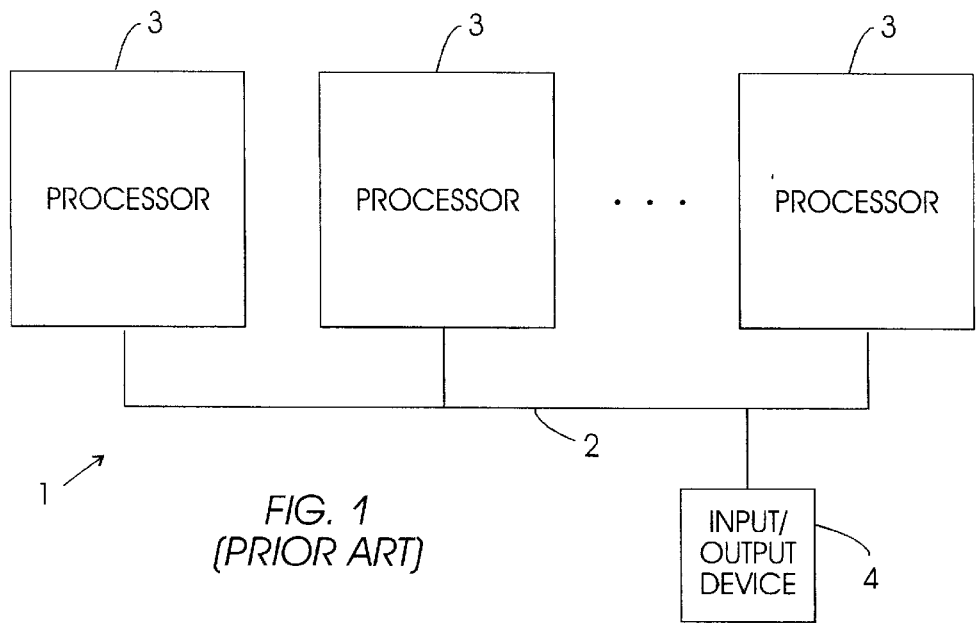
FIG. 1
(PRIOR ART)
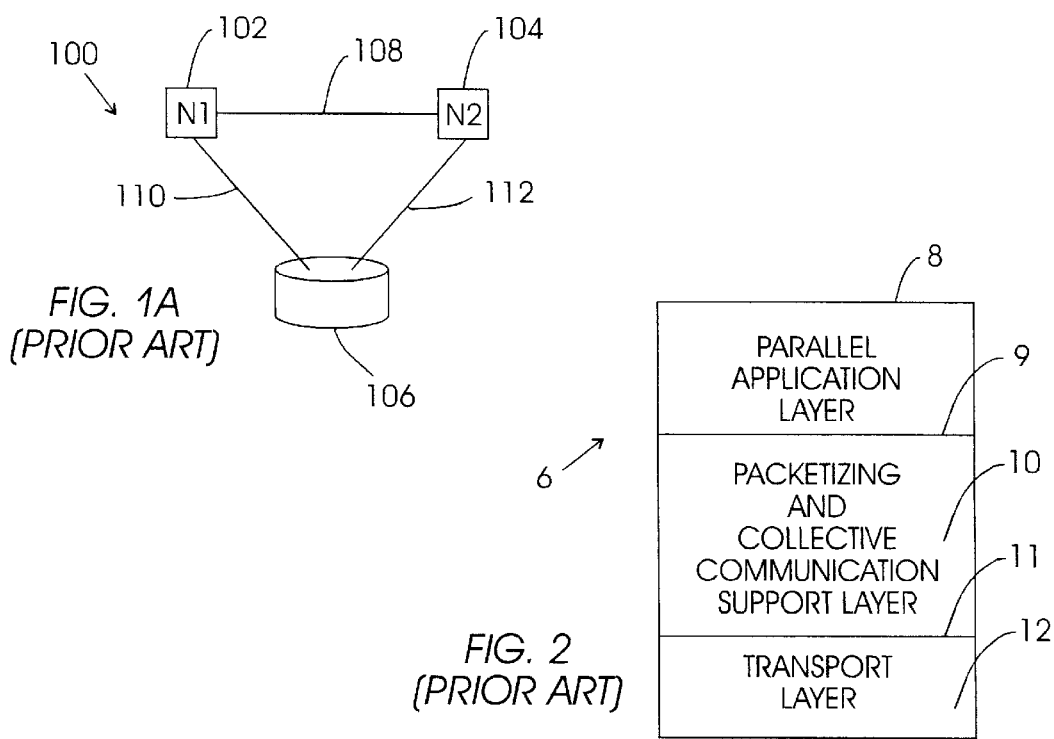
FIG. 1A
(PRIOR ART)
FIG. 2
(PRIOR ART)

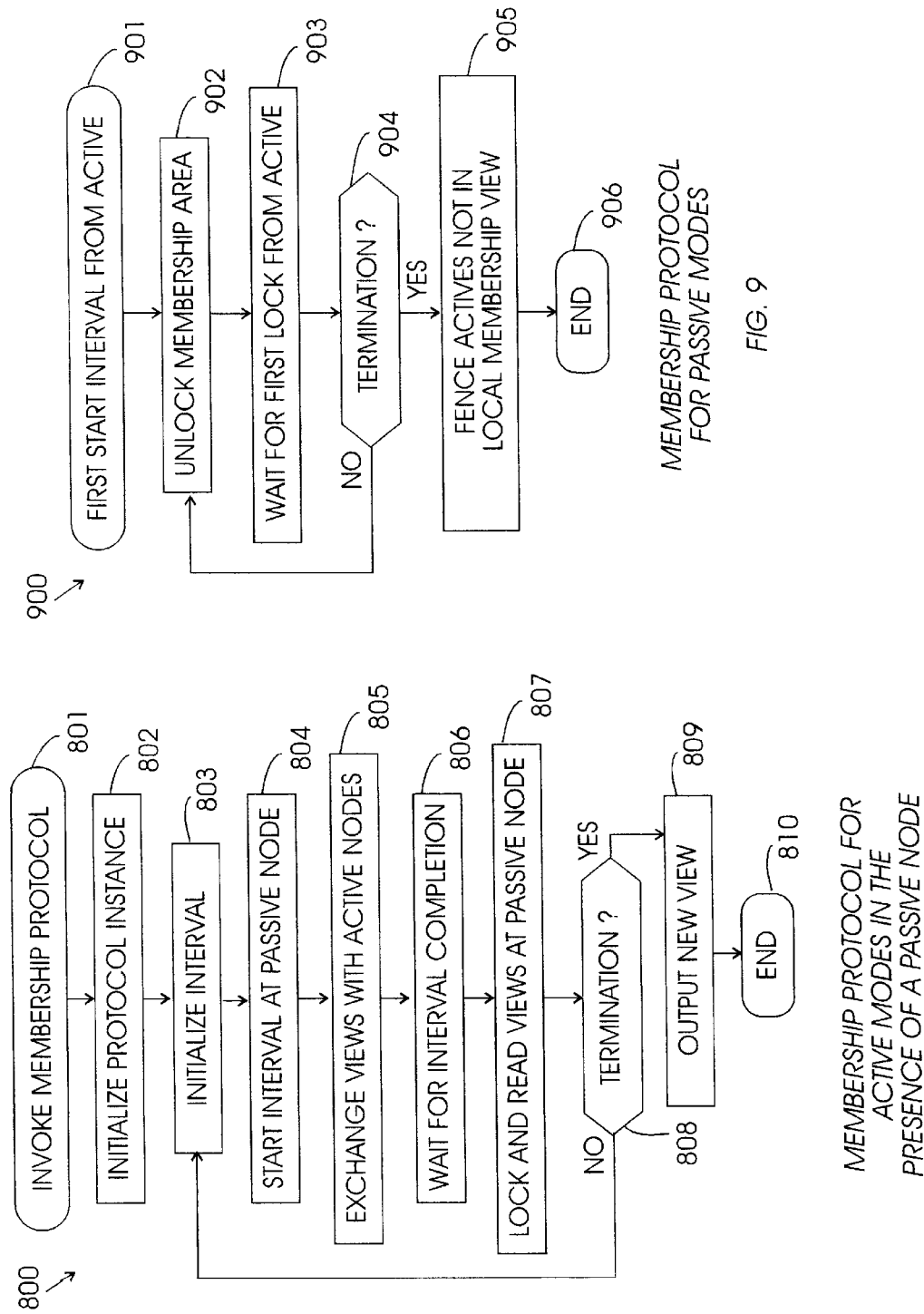

MAINTAINING AN AVAILABLE EXCLUSIVE LEADER TO CONTROL ACCESS TO A SHARED RESOURCE

AN ACTIVE NODE ATTEMPTS TO JOIN A MEMBERSHIP GROUP WITH ONE PASSIVE MEMBER

METHOD AND APPARATUS FOR ACCESSING SHARED RESOURCES WITH ASYMMETRIC SAFETY IN A MULTIPROCESSING SYSTEM

CROSS REFERENCE TO RELATED APPLICATIONS

This application is related to application "Method for Coordinating Membership with Asymmetric Safety in a Distributed System", by J. D. Palmer et al., Ser. No. 08/924,811, filed Sep. 5, 1997 (now U.S. Pat. No. 5,923,831, issued Jul. 13, 1999), which is commonly assigned with this application and incorporated herein by reference.

BACKGROUND OF THE INVENTION

1. Field of the Invention

The present invention relates generally to multiprocessing systems. More particularly, the invention relates to the arbitration of access among multiple competing processing nodes to a shared resource by conducting a membership protocol among all nodes of the system including the shared resource, where the shared resource subsequently fences nodes outside its membership view.

2. Description of Related Art

Multiprocessing computing systems perform a single task using a plurality of processing "elements", also called "nodes", "participants", or "members". The processing elements may comprise multiple individual processors linked in a network, or a plurality of software processes or threads operating concurrently in a coordinated environment. In a network configuration, the processors communicate with each other through a network that supports a network protocol. This protocol may be implemented using a combination of hardware and software components. In a coordinated software environment, the software processes are logically connected together through some communication medium such as an Ethernet network. Whether implemented in hardware, software, or a combination of both, the individual elements of the network are referred to individually as members, and together as a group.

Frequently, the nodes of a multiprocessing system commonly access a "shared resource". As an example, the common resource may comprise a storage device, such as a magnetic "hard" disk drive, tape drive or library, optical drive or library, etc. Resources may be shared for a number of different reasons, such as avoiding the expense of providing separate resources for each node, guaranteeing data consistency, etc.

FIG. 1A shows a multiprocessing system 100 where multiple processing nodes 102–104 have common access to a shared resource 106. The processing nodes 102–104 and shared resource are interconnected by communications paths 108–112. A problem arises when communications between the nodes 102–104 is interrupted, for example, due to failure of the communications path 108. This problem concerns the nodes' competing access to the resource 106, possibly resulting in extremely inefficient operation of the system 100.

In the absence of any scheme for arbitrating disputes between the incommunicant nodes 102–104, the system 100 may experience "thrashing" back and forth between the nodes 102–104, each node successively fencing the other node from resource access. This situation is undesirable, chiefly due to the inefficient time each node spends vying for access to the resource 106 rather than computing or actually accessing the resource 106.

Another approach to address the failure of the communications path 108 is to designate one of the nodes 102–104, in advance, to be master of the resource 106 in the event of a resource failure. This way, at least the active node will enjoy hassle-free access to the shared resource 106. However, the second node is completely blocked from accessing the resource 106. And, if the active node fails, then use of the resource 106 is absolutely frustrated.

Still another approach to failure of the communications path 108 is for the nodes 102–104 to communicate via the resource 106. For some users, this approach may be too inefficient, because communications between the nodes 102–104 occupies communications bandwidth otherwise used to exchange data with the shared resource 106. Furthermore, the nodes 102–104 are encumbered with additional overhead required for fault detection and resource control.

Consequently, due to certain unsolved problems, known communications recovery schemes are not completely adequate for some applications such as those with shared resources.

SUMMARY OF THE INVENTION

Broadly, the invention concerns a multiprocessing system that arbitrates access among multiple competing processing nodes to a shared resource by conducting a membership protocol among all nodes of the system including the shared resource, where the shared resource subsequently fences nodes outside its membership view. To determine the shared resource's membership view, active nodes repeatedly subscribe to the shared resource during prescribed membership intervals. From these subscriptions, an output membership view is generated for the shared resource. The membership protocol for the passive node ultimately ends when the membership view meets a termination condition guaranteeing asymmetric safety.

More specifically, in one embodiment a method is provided to determine access among multiple active nodes to a passive node in a multiprocessing system, with a communications network interconnecting the passive node and the active nodes. First, one of the nodes makes a membership protocol announcement. Responsive to the membership protocol announcement, a timer is started to expire after a fixed time. The time between starting and expiration of the timer defines a current membership interval.

Also responsive to the membership protocol announcement, each active node commences attempts at inter-nodal communications to identify all other nodes with which communication has not failed. All nodes so identified comprise a membership view. Further responsive to the membership protocol announcement, each active node commences an attempt to submit a subscription message to the passive node.

Subsequently, the timer expires, thereby closing the current membership interval. In response to the timer expiring, each active node establishes its membership view, made up of all other nodes identified during the current membership interval. Also established is the passive node's membership view, comprising all active nodes successfully submitting a subscription message during the current membership interval. The membership views of all nodes are integrated, using asymmetric safety, to establish an updated membership view of each node. Subsequent access to the passive node is then restricted according to the passive node's updated membership view.

The invention also includes another embodiment of coordinating access to shared resources in a multiprocessing system with multiple nodes subject to communications and node failures. The present invention prescribes that when communication or nodes failures are suspected, coordination problems be resolved by having each node, including nodes representing shared resources, participate in a membership protocol that provides asymmetric safety. For simplicity the present invention will be described in terms of methods that apply to a multiple node system containing one shared resource node. It will be obvious to one skilled in the art how to extend these methods to apply to multiple shared resource nodes.

One exemplary approach chooses a leader node among the nodes contending for the shared resource node. Depending on the access needs, the leader node may then have exclusive access to the shared resource node or the leader node may control the access of others, for example by maintaining a lock table for the shared resource node.

In one embodiment a method is provided to choose a new leader when it is suspected that the previous leader is no longer functioning properly or no longer able to access the shared resource node. Responsive to some indication that the previous leader may have failed (such as the timeout of a message requesting a response from the leader, or any such indication from any failure detection mechanism), a node may invoke a membership protocol that provides asymmetric safety. The participants in this membership protocol are all the nodes that can potentially access the shared resource and the shared resource node, itself. On completion of the membership protocol, if a regular (non shared resource) node finds that the shared resource node is not in its new membership view, the regular node attempts to rejoin the shared resource node; otherwise, after ascertaining that the shared resource node has completed the membership protocol, the regular node computes the identity of the new leader based on its local membership view, using a preselected one of many available policies for such selection (e.g. choose the first member in lexicographic order of id, or choose the old leader if it is still in the membership view or the next member after the old leader in lexicographic order of id, etc.). As soon as it has identified itself as the new leader, a regular node may begin acting in its capacity as leader. On completion of the membership protocol, a shared resource node fences all nodes not in its new membership view, preventing these nodes from accessing all but a special membership processing area of the shared resource.

Since a shared resource node may not always be able to perform all the functions required by the membership protocols referenced above, in another embodiment a new set of membership protocols is provided to function as part of the method described above. Each membership protocol described herein therefore has two counterpart membership protocols, one performed by active nodes that can perform all the functions required in the original protocol, and one performed by a passive node with a much more restricted repertoire.

Accordingly, one aspect of the invention is a method of coordinating access to a shared resource in a multiprocessing system. In contrast, a different embodiment of the invention may be implemented to provide an apparatus such as a multiprocessing system, configured to coordinate access to a shared resource among multiple processing nodes. In still another embodiment, the invention may be implemented to provide a signal-bearing medium tangibly embodying a program of machine-readable instructions executable by a digital data processing apparatus to perform method steps for coordinating access to a shared resource in a multiprocessing system.

The invention affords its users with a number of distinct advantages. Advantageously, the invention determines access to shared resources in a multiprocessing system using a membership protocol that achieves a non-blocking termination in a fixed amount of time. Even with crash failures, this approach accurately determines membership within a fixed finite time after crash detection. Furthermore, this approach imposes a minimal burden on the normal operation of the shared resource, leaving as much communications bandwidth as possible for the shared resource to conduct normal communications with the active nodes. The invention also provides a number of other advantages and benefits, which should be apparent from the following description of the invention.

BRIEF DESCRIPTION OF THE DRAWINGS

FIG. 1A is a block diagram of a distributed computing system with multiple processing nodes accessing a shared resource in accordance with the prior art.

FIG. 1 is a simplified block diagram of a typical distributed computing system that includes a plurality of processors for executing the method of the invention.

FIG. 2 shows a layer structure of a typical prior art software instance to which the membership protocol of the invention may be applied.

FIG. 8 is a flowchart of an operational sequence used by an active node to perform a membership protocol in a multiprocessing system that includes a passive node, in accordance with the invention.

FIG. 9 is a flowchart of an operational sequence used by a passive node to participate in a membership protocol in a multiprocessing system, in accordance with the invention.

DESCRIPTION OF THE PREFERRED EMBODIMENTS

As mentioned above, the present invention concerns the arbitration of access among multiple competing processing nodes to a shared resource by conducting a membership protocol among all nodes of the system including the shared resource, where the shared resource subsequently fences nodes outside its membership view.

Hardware Components & Interconnections
Distributed Computing System

FIG. 1 shows a simplified block diagram of a distributed computing system 1 in which the method of the invention may be practiced. The "distributed" nature of the system 1 means that physically or logically separate processing elements cooperative to perform a single task; these elements may be physically co-located or remote from each other, depending upon the requirements of the application.

In the illustrated example, the foregoing processing elements comprise a plurality of processors 3 connected to a communication interface 2. Also called "node", "members", or "participants", the processors 3 communicate with each other by sending and receiving messages or packets over the communication interface 2.

An input/output device 4 schematically represents any suitable apparatus attached to the interface 2 for providing input to the distributed system 1 and receiving output from the system. Alternatively, device 4 may be attached to one of the processors 3. Examples of device 4 are display terminals, printers, and data storage devices.

It will be understood that various configurations of distributed data processing systems known to a person of ordinary skill in the art may be used for practicing the method of the invention. Such systems include broadcast networks, such as token-ring networks, distributed database systems and operating systems which consist of autonomous instances of software.

In an exemplary embodiment, each of the processors 3 may comprise a hardware component such as a personal computer, workstation, server, mainframe computer, microprocessor, or other digital data processing machine. These processors 3 may be physically distributed, or not, depending upon the requirements of the particular application. Alternatively, the processors 3 may comprise software modules, processes, threads, or another computer-implemented task. Whether implemented in hardware, software, or a combination of hardware/software, the processors 3 preferably operate concurrently to perform tasks of the system 1.

Exemplary Digital Data Processing Apparatus

Another aspect of the invention concerns a digital data processing apparatus, which may be provided to implement one or all of the processors 3. This apparatus may be embodied by various hardware components and interconnections, and is preferably implemented in a digital data processing apparatus.

Figure 2A:
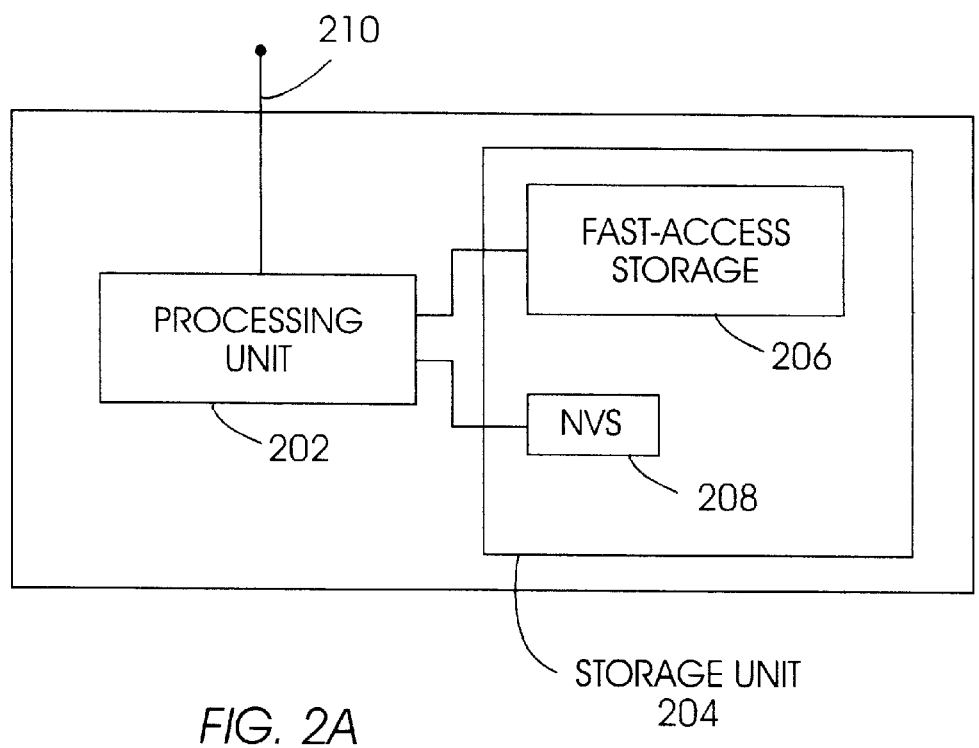
FIG. 2A is a diagram of an illustrative digital data processing apparatus according to one aspect of the invention.

FIG. 2A shows an example of one such digital data processing apparatus 200. The apparatus 200 includes a processing unit 202, such as a microprocessor or other processing machine, coupled to a storage unit 204. In the present example, the storage unit 204 includes a fast-access memory 206 and nonvolatile storage 208. The fast-access memory 206 preferably comprises random access memory, and may be used to store the programming instructions executed by the processing unit 202 during such execution. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processing unit 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

Software Instance Structure

Figure 2B:
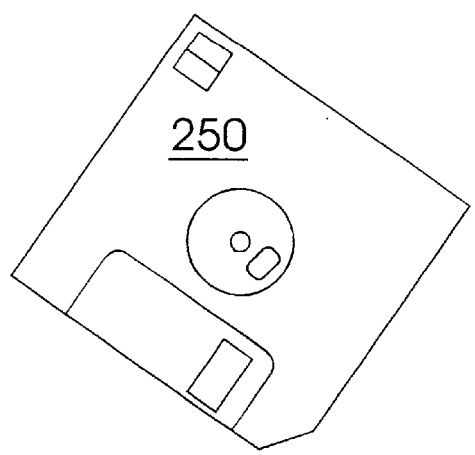
FIG. 2B is a diagram of an illustrative article of manufacture, comprising a signal-bearing medium, according to one aspect of the invention.

FIG. 2 illustrates the structure of a software instance 6 typical of the ones operating in the distributed computing system 1. Generally, each instance 6 has several software layers: a parallel application layer 8, a packetizing and collective communication support layer 10, and a transport layer 12. The parallel application layer 8 communicates with the packetizing and collective communication support layer 10 by making collective calls at a message interface 9. The message interface 9 is located between layers 8 and 10. An example of the message interface 9 is provided in the industry standard Message Passing Interface (MPI). Further details on this standard are described in "*MPI: A Message-Passage Interface Standard,*" published by the University of Tennessee, 1994. The packetizing and collective communication support layer 10 communicates with the transport layer 12 by sending and receiving packets through a packet interface 11.

To process an application in the distributed system 1, the application layers 8 of software instances 6 operate in parallel to execute the application. Typically, the software calls at the message interface 9 are coordinated among the instances 6 so that each of the call's participants can determine in advance how much data it is to receive from the other participants. It is also assumed that any one of the instances 6 may suffer a failure at any time. A failure may be a crash or a failure by the instance to meet a certain deadline such as a deadline to receive a packet from another instance. It is also assumed that the communication interface 2 has sufficient connectivity such that, regardless of failures other than those of the interface 2, any two operating software instances 6 can communicate through the communication interface 2.

Operational Embodiments

In addition to the various hardware embodiments described above, a different aspect of the invention concerns a method for accessing shared resources in a distributed data processing system, where a failure of communications between processing nodes is dealt with by treating the resource as a processing node in the system, and then performing a membership protocol with asymmetric symmetry to estimate current membership among all processing nodes.

Signal-Bearing Media

In the context of FIGS. 1–2, such a method may be implemented, for example, by operating each processor 3, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to access shared resources in a distributed data processing system.

This signal-bearing media may comprise, for example, RAM (not shown) contained within each processor 3, as represented by the storage unit 204 of the digital data processing apparatus 200, for example. Alternatively, the instructions may be contained in another signal-bearing media, such as a magnetic data storage diskette 250 (FIG. 2B), directly or indirectly accessible by the processing unit 202 of the digital data processing apparatus 200. Whether contained in the a diskette 250, the storage unit 204, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise compiled software code, such as "C" language code.

Basic Membership Coordination

Figure 3:
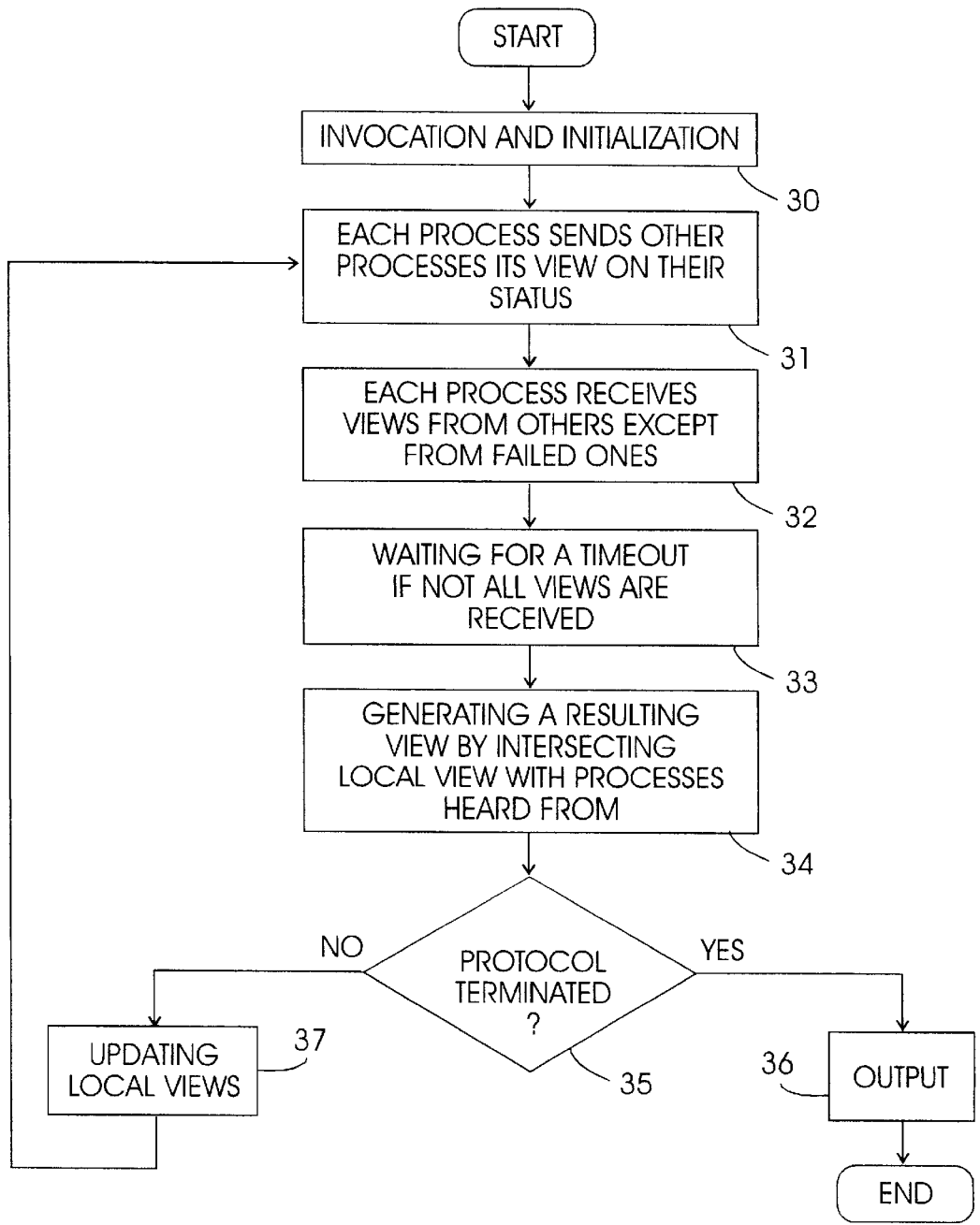
FIG. 3 is a flowchart showing a general operational sequence of the membership protocol with asymmetric safety in accordance with present invention.

FIG. 3 is a high-level flowchart showing the basic operation of the method for coordinating membership subject to an asymmetric safety condition among the processes of a distributed system, in accordance with the invention. The steps shown in FIG. 3 are performed by each member process that has been invoked by a distributed application participating in a membership group. In some distributed systems, the membership method may be invoked synchronously by all participating application processes. Synchronous invocation of the method will be described below in more detail with reference to FIG. 4. In other systems, the method may be invoked either by a membership event (such as a failure detection or a request to join a membership group) or by receipt of a membership message from another process that has invoked the method. These types of invocation are described further below in reference to FIG. 5. Each invoking application process is assumed to have a unique name for its identification. For the purpose of describing the invention, a membership view (or view) will be a set of names of application processes participating in a membership group.

Starting with step 30, the method is first invoked and initialized by one of the processes in the system. In steps 31 and 32, the processes exchange their local views on the status of the processes in the system. During this view exchange, each process sends to the other processes its local view on the status of the others in step 31. In addition, it receives the views from other processes, except from those it regards as failed in its local view, in step 32. The order of steps 31 and 32 is not critical. The "interval" of view exchange is terminated if a timeout occurs and each process has not received all the views from those not regarded as failed in its own view, as shown by step 33. In step 34, each process generates a resulting view by intersecting its local view with the set of names of the processes from which it has received views. It is noted that the resulting view is formed very differently than views formed by existing membership protocols. The method then checks whether a protocol-termination condition is met in step 35. If so, the end-of-interval view becomes an "output view", which is output in step 36. If the protocol-termination condition is not met, the local views are updated and the method steps are reiterated starting from the view exchange steps, as shown by step 37.

In a preferred embodiment of the invention, each process of the membership protocol maintains an array $V(q,r)$ capable of storing any set of names making up a view. The variable q ranges over names and variable r ranges over positive integers up to a maximum larger than the size of any membership group to which the method is applied. Each membership process also maintains two view variables, R and S, a name variable p, counters m and k, and a Receive Buffer. The view variables R and S are used for holding views generated by the process during the operation of the membership protocol. The counters m and k keep track of the number of times the protocol is invoked and the number of interval of view exchanges among the processes, respectively. The Receive Buffer is large enough to store more membership protocol messages than the size of any membership group with which the protocol will deal. The structure of the membership protocol messages will be described in more detail below.

During the invocation and initialization step 30, the above data structure is initialized as follows. The variable p is set to the name of the invoking application process The counter k is initialized to 1 to indicate the first interval of exchange of views. $V(p,1)$ is set to represent the current view of the membership, which is the original membership or the output of the last completed membership protocol less any members that have since been detected as failed plus any members that have been added because of join protocols. It is noted that p is included in $V(p,1)$. The storage for all $V(q,k)$ locations other than $V(p,1)$ is initialized NULL. The variable m is a counter of the number of instances of membership invocation for the membership group, and is passed as a parameter from the invoking process. Also in the input step 30, any interval 1 membership protocol messages for the m-th invocation received before the membership protocol process was invoked are transferred to the Receive Buffer.

In the view exchange stage (steps 31–32), a data structure composed of four parts, $V(p,k)$, p, k, and m, is sent in a membership protocol message to each of the other participants in the protocol. In this message, m indicates the invocation number, k indicates the interval number, p indicates the source of the message, and $V(p,k)$ represents the membership view of process p during interval k. The membership protocol message may be sent as a point to point message to each participant or it may be sent via a broadcast message in a broadcast communication medium that includes some or all of the participants. After the interval k membership protocol message is sent, a timer is started to signal a timeout after a specified time $T(k)$, which may depend on the interval number. This timeout time is chosen to be sufficient for most round trip communication between any two processes, including the processing of protocol messages between members unless there are unusual and significant delays. A late round trip communication will be treated like a system failure.

Once the method for coordinating membership is invoked, the invoking process passes all membership protocol messages for invocation m to its Receive Buffer as the messages are received. (Membership protocol messages for the wrong invocation number are discarded.) If a membership protocol message with a data structure $<V,q,k,m>$ is found in the Receive Buffer during the view exchange stage, then $V(q,k)$ is set to V. If a membership protocol message with a data structure $<V,q,r,m>$ is found with r not equal to k, then it is discarded. In the preferred embodiments, the view exchange steps 31–32 continue until a timeout is signaled. The membership protocol then enters the result generation phase (step 34).

In step 34, a resulting view R is computed as the intersection of $V(p,k)$ with the set $\{q \backslash V(q,k)$ is defined (not NULL)$\}$ of the names of the processes from which interval k messages have been received (or sent in the case of p). It is noted that, as an optimization, otherwise correct messages from the processes with names not included in $V(p,k)$ may be discarded from the Receive Buffer. Control is then passed to step 35 to determine whether a protocol-termination condition for the membership process is satisfied.

In step 35, if either R={p} or for each q in R, [V(q,k)=R], then the method terminates with the output step 36. Otherwise, it continues with the view-updating step 37. In the output step 36, the resulting view R is returned to the invoking application process as the new membership view.

In step 37, each process updates its local view based on the resulting view R and the views received by that process. There are two alternative preferred embodiments for the computation of the updated view S in step 37. In the first alternative, S is set equal to R. In the second alternative, S is chosen so that it is the lexicographically first subset of R to maximize the cardinality of the result of intersecting S with the intersection of the sets {V(q,k)\q in S}. As can be seen, the first alternative is simple. However, the second alternative has a better tolerance for lost messages. Having chosen S in step 37, the view V(p,k+1) is computed as the result of intersecting S with the intersection of the sets {V(q,k)\q in S}. The counter k is then incremented by 1 and the method steps are repeated starting with the view exchange (steps 31–32).

In an alternative preferred embodiment that trades longer time for more tolerance for lost or delayed messages, each interval (steps 31 through 34) can be repeated a specified number of times (e.g., 2) before taking the best results on to step 35 (checking for termination of the protocol).

Cooperative Computing

Figure 4:
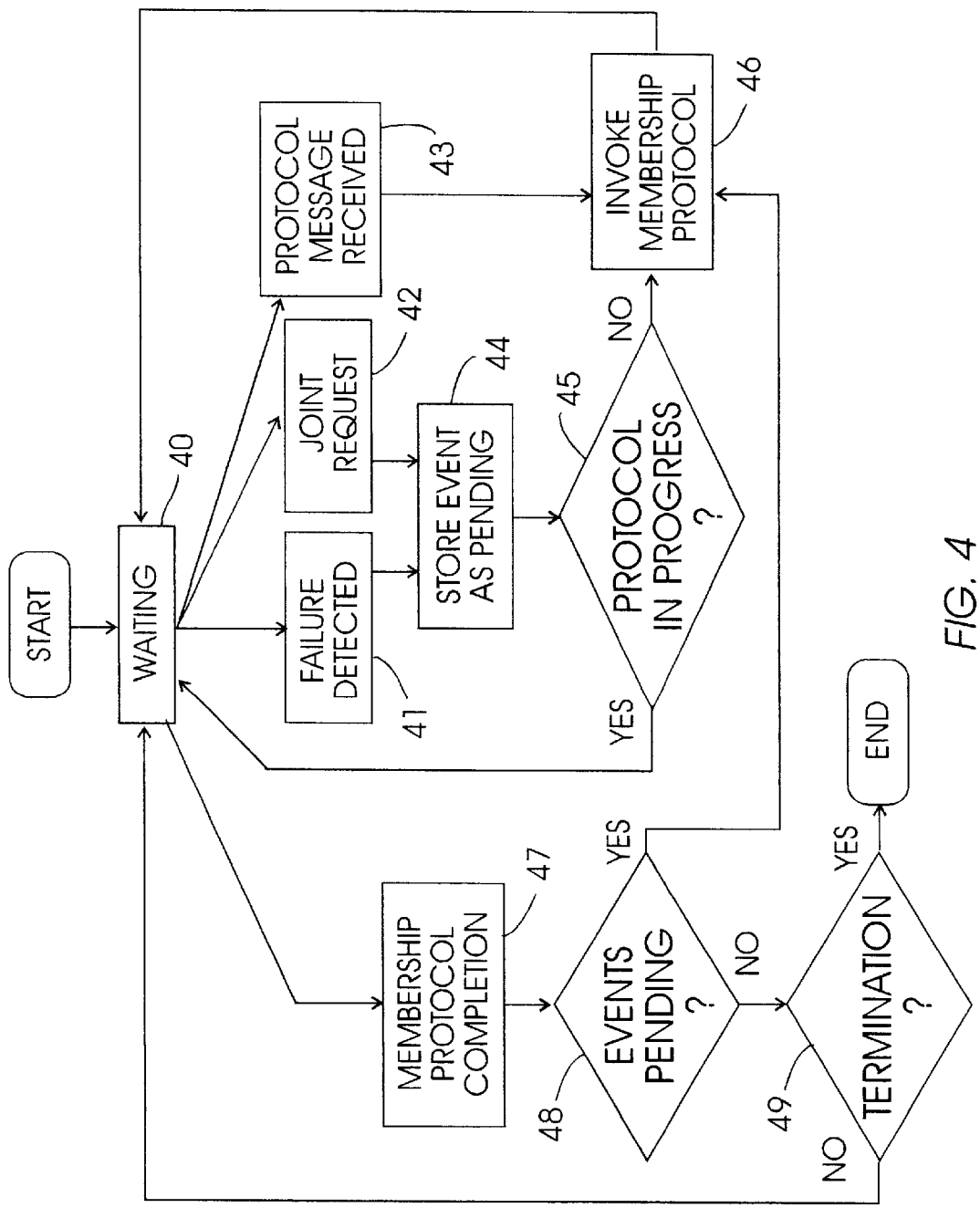
FIG. 4 is a flowchart representing the general operation of a cooperative computing method based on the membership protocol of FIG. 3, in which several processes participate in a group to achieve a cooperative computing goal.

FIG. 4 is a flowchart representing the general operation for a cooperating computing method based on the membership protocol with asymmetric safety described in FIG. 3, in which several application processes participate in a membership group to achieve some cooperative computing goal. FIG. 4 shows the method steps employed by each participating process relative to the invoking of the membership protocol in step 46. The initial step 40, which is labeled "waiting", represents the state of an application process while it pursues its cooperative computing goal and waits (asynchronously) for membership events such as a detected failure (step 41), Join Request (step 42), receipt of a membership protocol message (step 43), and the completion of the membership protocol (step 47).

FIG. 4 reflects the steady state of the cooperative computation. At its beginning, a group of application processes are started with the same initial view of their membership. After the original set of processes has started, each process sets its invocation number (m) to 1 and invokes the membership protocol in step 46. The original group may consist of a single process. A new process may be added by bringing up the process and then sending a Join Request in its name to each member of the current group. Also, each member process typically includes some mechanism for detecting failures in the process. For example, each could periodically broadcast its identity to the others. If some specified number of such messages from one member were missed, then a Failure Detection event 41 listing the member process whose messages had not arrived would be triggered.

In the case of a Failure Detection 41 event indicating that a process q is missing, control passes to step 44 and an event <Failure Detection of q> is stored in a Pending Membership Event queue.

In the case of a Join Request 42 indicating a process q is to join, control passes to step 44 and an event <Join Request for q> is stored in the Pending Membership Event queue.

After step 44, control passes to step 45 in which a "Membership Protocol In Progress" flag is checked to determine whether a membership protocol is in progress. If no membership protocol is in operation, then the membership protocol is invoked in step 46. Otherwise, control returns immediately to the waiting state (step 40).

When a protocol message 43 is received while a current membership protocol is in progress, if the invocation number is equal to that of the current membership protocol, the message is passed to the Receive Buffer of the membership protocol process and control returns immediately to the waiting step. If the invocation number is not equal to that of the current membership protocol, then the message is discarded and control returns immediately to waiting step 40. If no membership protocol is in progress, then, if the invocation number is less than or equal to the current value of the invocation counter m, the message is discarded and control returns immediately to step 40. Otherwise, the message is passed as an additional parameter during the invocation step 46. In this case, m is set to the invocation counter of the message and passed along with the current membership view V and the new message as parameters to the invoked membership protocol process.

In step 46, if not set from a new message, the invocation counter m is incremented by 1. Each event is removed from the Pending Membership Event queue and processed as follows: If the event is <Failure Detection of q> then q is removed from V; If the event is <Joint Request for q> then q is added to V), the Membership Protocol in Progress flag is set to "yes", a membership protocol is invoked with parameters m, V, and a new message if any, and control returns to step 40.

When the membership protocol is completed (step 47), control passes to step 48 where entries in the Pending Membership Event queue are removed if they have been accommodated by the completed instance of the membership protocol. If the event is <Failure Detection of q>, it is accommodated if q is no longer in the current membership view. If the event is <Join Request for q>, it is accommodated if q is in the current membership view. If there are entries remaining in the queue that have not been accommodated, then the method continues with another invocation of the membership protocol in step 46.

Parallel Computation

Figure 5:
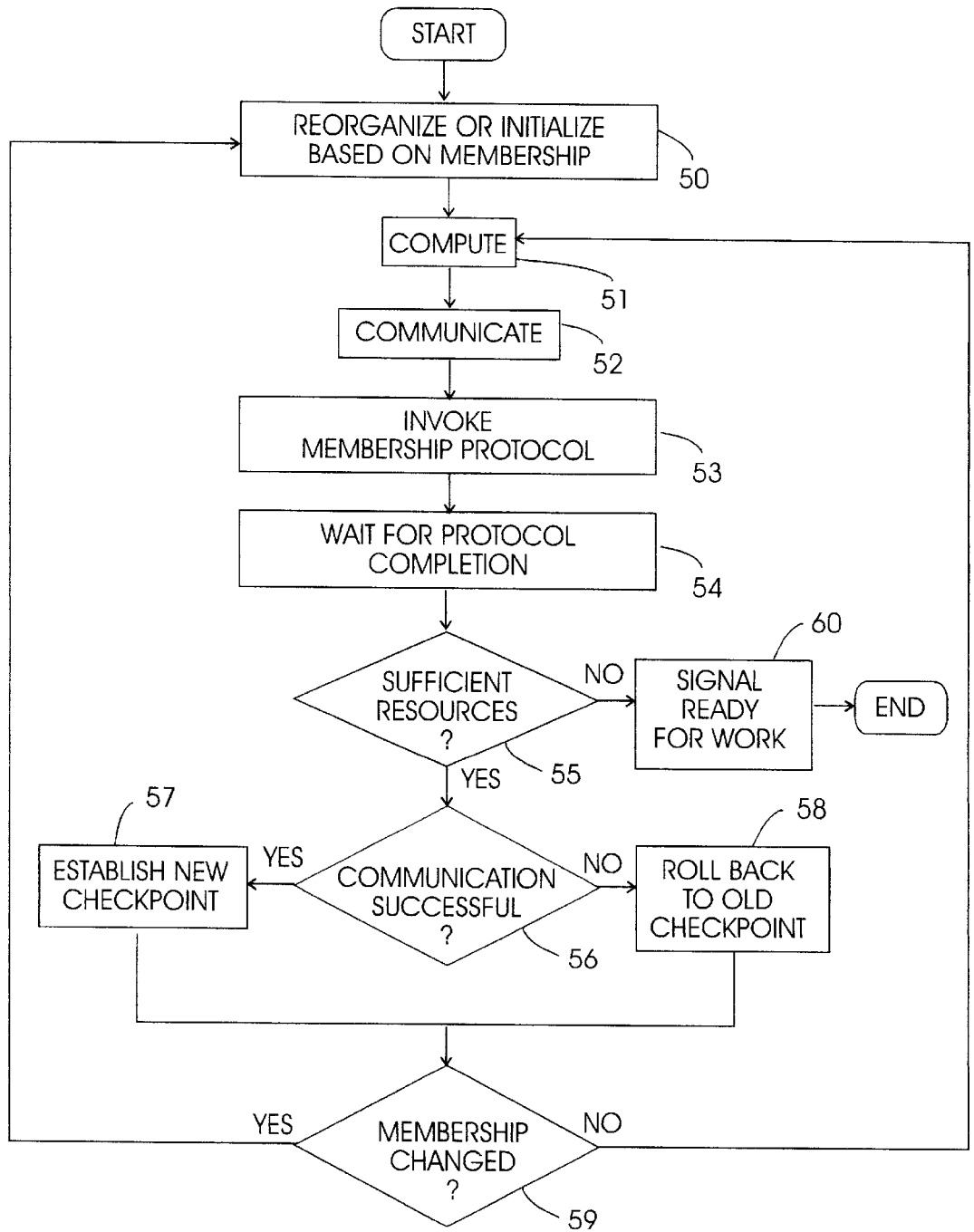
FIG. 5 is a flowchart representing the operation sequence of another use of the membership protocol of the present invention, in which a group of application processes perform a parallel computation.

FIG. 5 is a flowchart representing the operation sequence for another use of the membership protocol of the present invention in which a group of application processes perform a parallel computation. The processes operate in synchronous phases of computation and communication, such that after each successful communication phase, each member computes a new checkpoint from which the entire computation can be continued. In this context, it is further assumed that each application process can decide which work to do in the computation phase from the latest checkpoint and the membership view. This decision is performed in step 50.

The method then enters a computation phase 51. When this phase is complete, control passes to a communication phase 52 in which failures may be detected by the parallel processes. If no failures are detected, it is assumed that the communication phase 52 is successful. At the end of the communication phase, the membership protocol is invoked in step 53. The invocation counter m is incremented by 1, the current view V is changed to reflect any detected failures (or any new processes that have requested to join as in FIG. 4), and the membership protocol is invoked with parameters m and V.

Next, the application process waits for the membership protocol to return a new membership view, in step 54. When the membership protocol returns the new view, the results of the membership protocol are checked to test whether there are sufficient resources to continue the parallel computation, as shown by 55. (This can also be the place to check whether the computation is finished.) If there are insufficient resources (or no further computing is required), then control passes to step 60; otherwise control passes to step 56.

In step 60, the current membership is no longer needed for its previous task. Each member (or the leader, selected by lexicographic order from the membership) can indicate its readiness to take on a new task or negotiate to join another membership group with current work. In step 56, if the communication phase was successful, then a new check point is established in step 57. Otherwise, the computation is rolled back to the previous checkpoint in step 58. In either case, from step 57 or step 58, control passes to step 59 where the method determines whether there has been a membership change. If so, the method continues with step 50 in which the computation is reorganized to fit the new membership. Otherwise, it proceeds to the computation step 52. In either case, the parallel computation continues.

Advanced Membership Coordination: Membership Protocol Involving Passive Node

As discussed in detail above, one aspect of the present invention involves coordinating membership among members of a multiprocessing system, subject to an asymmetric safety condition. This technique may be further expanded to coordinate membership in systems including a "passive" node that lacks sufficiently powerful computing facility to participate in a normal membership protocol, or chooses to use such facility for other purposes.

Figure 6:
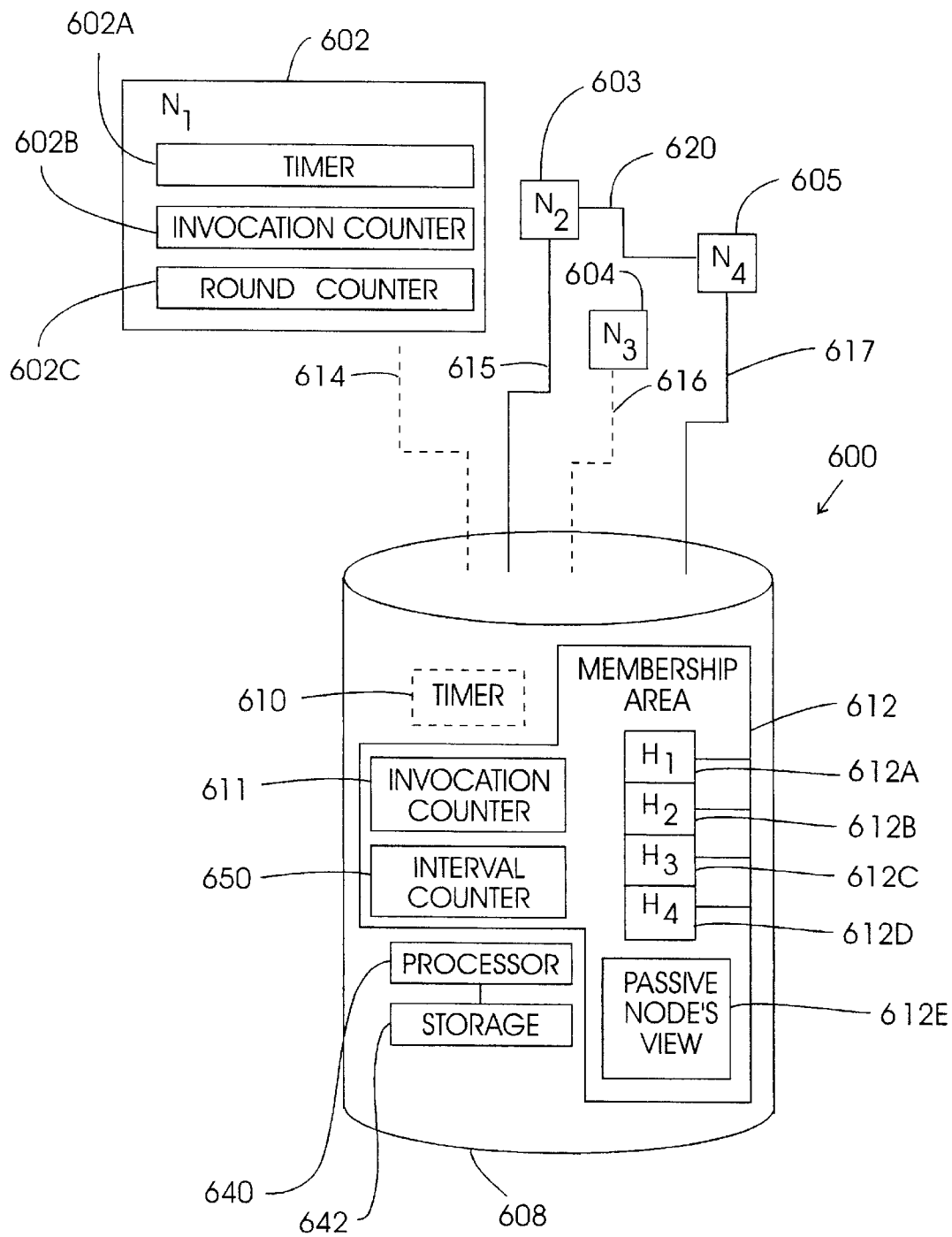
FIG. 6 is a block diagram of an illustrative multiprocessing system with a shared resource, in accordance with the invention.
Figure 7:
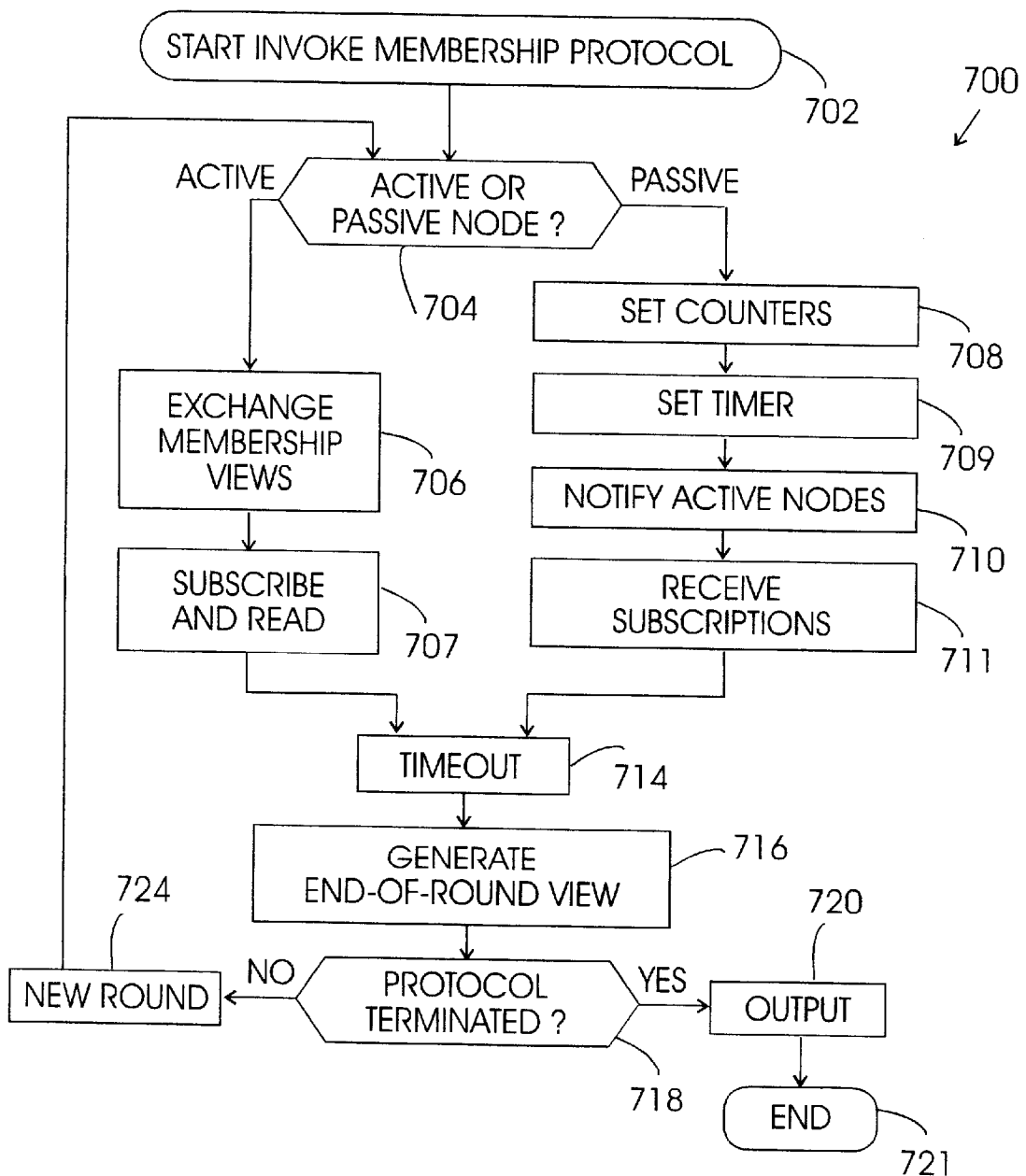
FIG. 7 is a flowchart showing an overview of various stages involved when a node performs a membership protocol in a multiprocessing system having a shared resource, in accordance with the invention.

To illustrate an overview of membership coordination in a multiprocessing system having a passive node, reference is made to FIGS. 6–7. FIG. 6 depicts an exemplary multiprocessing system 600 with active nodes and one passive node, and FIG. 7 depicts various stages involved in performing a membership protocol in such a multiprocessing system.

A. Environment

The system 600 includes multiple member nodes, including active nodes 602–605 and one passive node 608. Each active node may comprise, for example, a personal computer, workstation, mainframe computer, microprocessor, or another digital data processing machine, such as an apparatus 200 (FIG. 2A). Each active node is preferably uniquely identified by a "host-ID", comprising a numeric, alphabetic, alphanumeric, or other unique machine-readable code.

Each active node includes a timer, an invocation counter, and an interval counter. Although not shown in the nodes 603–605, each node is understood to include component as exemplified by the node 602's timer 602a, invocation counter 602b, and interval counter 602c. Each active node's timer is set and later expires to effect a timeout condition, for reasons discussed below. Each active node's invocation counter identifies a current instance of membership protocol, as distinguished from earlier or later membership protocols. Each active node's interval counter keeps track of the current "interval" or "round" within the presently active membership protocol.

The passive node 608 is the shared resource, and in this particular example comprises a magnetic "hard" disk drive. The passive node 608 has various subcomponents, including a processor 640, storage 642, timer 610, and a membership area 612. The membership area 612 includes an invocation counter 611, an interval counter 650, multiple membership sub-portions 612a–612d, and a passive node view area 612e. The membership sub-portions 612a–612d correspond to the hosts 602–605, respectively, and the area 612e corresponds to the passive node 608 itself. In one embodiment, each sub-portion 612a–612d is in software created when the corresponding active node requests allocation of the sub-portion, for example as part of a "join" operation described below.

As explained below, the active nodes 602–605 "subscribe" to the shared resource's membership view by placing certain data in the membership area 612. Accordingly, the area 612 preferably comprises a volatile memory. Thus, if the shared resource 608 is powered down or otherwise reset, the membership area 612 is cleared and the newly operating resource 608 will defer all requests from initiators until performance of the next membership protocol. Such a membership protocol may in fact be triggered by the restarting of the resource 608, if desired.

The processor 640 may comprise any suitable digital data processing machine, such as a microprocessor, computer, application specific integrated circuit, discrete logic devices, etc. As an example, where the passive node 608 is a magnetic disk drive, the processor 640 is implemented in the drive's disk controller. In this embodiment, the storage 642 comprises digital data storage unit such as a ROM suitable for storing microcode, "firmware", or other machine-readable instructions executable by the processor 640. Other types of storage may be suitable, however, such as RAM, DASD, etc.

The passive node's timer 610 and counters 611/650 have similar functions to the active node's timer and counters, as introduced above, and discussed in greater detail below.

The passive node 608 and active nodes 602–605 are nominally interconnected by communications paths 614–617. In the illustrated example, the paths 614 and 616 have failed, and are therefore distinctively shown by dotted lines. In addition to these connections, the active nodes 603 and 605 are interconnected by a communications path 620.

Basically, the subcomponents of the passive node 608 are used to enable the passive node 608 to participate in a membership protocol, even though the passive node 608 is a passive device relative to the active nodes 602–605. The passive node 608 is a "passive" device in the sense that it serves the active nodes 602–605, and may not contain sufficiently powerful computing hardware to participate in a normal membership protocol as discussed above. The passive node 608 may, however, have the same or more computing power than the active nodes, if desired, where such computing power is allocated for other purposes. Thus, the passive node 608 may be passive in hardware features or merely operational configuration.

B. Membership Protocol Involving Passive Node: Operational Sequence

In an environment with active and passive nodes, such as FIG. 6, each node performs a membership protocol involving various stages as shown by the sequence 700 in FIG. 7. FIG. 7 is described in the context of the multiprocessing system 600 merely for ease of explanation, without any limitation intended thereby.

In this example, the node (passive or active) performing the sequence 700 is called the "executing node." The sequence 700 starts in step 702, when a membership protocol is invoked. A membership protocol may be invoked for a number of different reasons. Chiefly, one of the active nodes 602–605 may invoke a membership protocol when it experiences a communications failure with another node. Another reason, for example, is when a node invokes a membership protocol as a request to join the system 600.

After step 702, step 704 routes control to step 706 (if the executing node is an active node) or step 708 (if the executing node is a passive node). If the executing node is an active node, it performs step 706 by exchanging membership views with the active nodes 602–605. Having sufficient processing power to do so, the executing active node is able to function like the processes in step 31 (FIG. 3) discussed above. During the first interval, step 706 is implemented by the active nodes exchanging messages with other active nodes to determine their membership views anew, and then exchanging these newly generated views with each other. During subsequent intervals, step 706 is implemented by the active nodes exchanging their recent "updated" views, calculated in step 724 as discussed below.

Next, in step 707 the executing node performs a membership exchange with the passive node, by "subscribing" to the passive node. This process is described in greater detail below. Also in step 707, the executing node obtains the passive node's membership view by reading the contends of the view area 612*e*.

Instead of steps 706–707, a passive executing node constructs it membership view using steps 708–711. Although these steps are described in greater detail below, a brief explanation follows In step 708, the passive node's invocation counter 611 designates a unique membership invocation number; this occurs once each time a membership protocol involving the passive node 608 is invoked. The invocation counter 611 uniquely identifies the current instance of invoking the membership protocol. Also in step 708, the passive node's interval counter 650 is set. The interval counter 650 functions differently than the invocation counter 611. Namely, another counter is needed since steps 708–711 may execute repeatedly for the passive node 608, depending upon when the passive node's protocol finally terminates in step 718. The interval counter 650 tracks the number of times step 708–711 execute for the passive node.

In step 709, the passive node 608 sets its timer 610 to a predetermined value and begins its countdown. This time period is called the "membership interval". As explained below, the active nodes 602–605 must take certain action, called "subscribing", during this period, or else be absent from the passive node 608's end-of-interval membership view.

In step 710, the passive node 608 notifies the active nodes 602–605 of the initiation of the current membership interval. This may be performed passively, by configuring a flag or other setting in the passive node 608 to alert active nodes that happen to check that setting. Or, step 710 may be performed actively, by the passive node 608 sending the active nodes 602–605 a special message, or by appending a special prefix or suffix to messages exchanged with the nodes 602–605 in the course of other, unrelated business.

In step 711, the active nodes that are aware of the membership interval "subscribe." This is achieved by each active node writing its current interval counter value, invocation counter value, and "updated" membership view into its own sub-portion 612*a*–612*d* in the membership area 612. (Updated membership views are calculated in step 724, as discussed below.) By writing its counter values, the subscribing active node identifies itself to the passive node 608, thereby subscribing to the passive node's membership view of the current interval. Also, the active node's writing of the membership view into the sub-portion 612*a*–612*d* is useful in later determining (as discussed in step 718, below), whether the passive node 608 satisfies a membership protocol termination condition ("protocol-termination condition").

For use in their subscriptions of step 711, the active nodes 602–605 have already obtained the current membership interval number by their notification of the membership interval in step 710, whether that notification occurred passively or actively. The passive node disregards any active nodes attempting to subscribe with an out-of-date invocation counter.

In step 714, the executing node experiences a timeout condition when its timer expires. If the executing node is an active node, step 714 also involves the node notifying the passive node 608 of its timeout. This ends the current interval of the executing node's participation in the membership protocol.

When timeout occurs for the passive node, or when the passive node 608 receives notification of the first active node timeout, the passive node 608 locks the membership area 612, making it read-only. This is done to accurately fix the passive node's membership view as of the end of the membership interval. The membership area 612 reopens as soon as data written to the area 612 cannot affect the membership views; for example, the area 612 may reopen when the next membership interval begins or when the passive node's invocation counter 611 is incremented.

Since the first node to experience an expired timer stops the membership interval despite the other nodes awareness of this fact, this approach is non-blocking. A timeout is guaranteed to occur as long as one active node has access to the shared resource 608. If one active node or its communication with the shared resource 608 fails, that node's timeout cannot end the membership interval; the membership interval will ultimately end, however, when a timeout occurs at another node that has already invoked, or later invokes a membership interval.

After step 714, each node 602–605 and 608 determines its "end-of-interval" view in step 716. In particular, each active node's end-of-interval view includes all other nodes it received return messages from during step 706. In the case of the passive node 608, the end-of-interval view includes all active nodes that successfully subscribed during this interval in step 711.

Next, step 718 asks, for the executing node, whether a protocol-termination condition is satisfied. This may be determined using similar criteria as step 35 (FIG. 3) discussed above. Generally, the protocol terminates for the executing node when either (1) the node's end-of-interval view contains that node only, as a "singleton", or (2) the node's end-of-interval view (from step 716) is identical to all other nodes's updated views that the executing node received in step 706.

Advantageously, the protocol-termination condition guarantees asymmetric safety among the nodes 602–605. Generally, asymmetric safety permits each node to have any membership view, unless two nodes include each other in their membership views; in this case, the two nodes must have identical membership views. Thus, if one node perceives another node in its membership view, but not vice versa, asymmetric safety is satisfied.

If the protocol-termination condition is met, step 720 provides an "output view" constituting the executing node's latest end-of-interval membership view, and the routine 700 ends in step 721.

If the protocol is not terminated, step 724 begins a new interval. This includes incrementing the executing node's interval counter 650. Also, step 724 creates an "updated" membership view for the executing node by comparing and intersecting its end-of-interval membership view with the membership views received from the other nodes during the last round. The generation of an updated membership view is discussed in greater detail above, with reference to step 37 (FIG. 3).

After step 724, the next round starts by returning to step 704. The executing node repeatedly performs the routine 700, completing successive intervals, until the protocol-termination condition is met, ultimately guaranteeing asymmetric safety among the nodes 602–605. In extreme cases, the executing node may a node may end up with no other nodes in its view, this node becoming a "singleton".

C. Membership Protocol Involving "Super-Passive" Node: Operational Sequence

In contrast to the embodiment of FIG. 7, an alternative embodiment may be implemented when the passive node is a "super-passive" node. Although different variations are possible, a super-passive node generally comprises a passive node possessing or using even less computing power then the passive node described above. As a particular example, a super-passive node lacks the timer 610, invocation counter 611, and interval counter 650 described above in FIG. 6. Instead, the super-passive node may include the components of the node 602, but simply forego their use.

When the passive node of the system 600 is super-passive, the membership protocol sequence 700 (FIG. 7) is preferably implemented using one sequence performed by active nodes (FIG. 8), and a different sequence performed by the super-passive node (FIG. 9).

In this embodiment, each active node includes facilities for detecting the possibility of failure at other nodes, such as timing out round trip messages or commands with required responses. Although the system 600 assumes these detection facilities to accurately detect such failures, they may signal a possible failure of a node when none has occurred or when the failure is in the communications links connecting the nodes.

1. Active Node Participation in Membership Protocol Involving Super-Passive Node As mentioned above, FIG. 8 depicts a flowchart of an operational sequence used by each active node to perform a membership protocol, in a multiprocessing system with a super-passive node. The steps 800 are performed by each active node, responsive to an invocation of the membership protocol in step 801. The conditions under which a membership protocol may be invoked are discussed in greater detail above.

In this discussion, the active node executing the sequence 800 is called the "executing node". In step 802, the executing node initializes the current instance of membership protocol for itself. Namely, the executing node increments its invocation counter to represent the new membership protocol (invoked in step 801). Also in step 802, the executing node initializes its interval counter to zero, indicating no interval yet.

In step 803, the executing node sets its timer to a predetermined value, and increments its interval number counter by one. The interval number of one signals the first time through the sequence 800 in a given instance of membership protocol execution. For interval one, the executing node's membership view is the input view presented at invocation of this instance of the protocol. For subsequent intervals, the membership view for the interval is computed according to the update method selected, as described above.

In step 804, the executing node attempts to start a membership interval at the passive node, which will be successful unless another active node has already done so. This is preferably performed by the executing node issuing a Start_Membership_Interval command described below. Also in step 804, the executing node writes its invocation counter and interval counter values, together with its updated membership view for the current interval, to the executing node's sub-portion of the passive node's membership area 612. This data is preferably written to the membership area 612 using the command Write_Membership_Area, described below.

For each command issued to the passive node, including the commands issued in step 804, the executing node preferably sets a message timer (not shown). If the message timer expires before completion of a command, then the command and any late response are ignored.

In step 805, the executing node exchanges views with other active nodes, to the extent these nodes are able communicate with each other despite any failures, as discussed in detail above.

In step 806, the executing node waits until an "interval-termination condition" is met. This condition is met upon the earlier of the following events: (1) the expiration of the executing node's timer set in step 803 for this interval, or (2) the receipt of messages from all other active nodes in the updated executing node's membership view during this interval. When either of these conditions is met, the interval-termination condition is met, and control passes to step 807.

In step 807, having completed the interval, the executing node attempts to lock-in the passive node's membership views. This preferably done by the executing node issuing a Truncate_Membership_Interval command (described below) to the passive node 608. Although the executing node "attempts" to close the current membership interval, this attempt may be unsuccessful if a different active node has already closed the passive node's membership interval after timing out, unbeknownst to the executing node.

Also in step 807, the executing node reads the passive node's membership view of the current interval from the view area 612e, preferably by issuing a Read_Membership_Area command (described below) to the passive node. The passive node's construction of its membership view is explained in greater detail below with reference to FIG. 9. The passive node's membership view, obtained in step 807, is treated as if it was obtained via message exchange during steps 805 and 806.

After step 807, step 808 tests for the protocol-termination condition, as shown above. If the protocol does not terminate, control passes back to step 803. If the protocol does terminate, then control passes to step 809 where the end-of-interval view is becomes the node's "output view" resulting from completion of the protocol, and the protocol instance indicates its completion (step 810).

2. Super-Passive Node Participation in Membership Protocol

FIG. 9 depicts a flowchart of an operational sequence performed by a super-passive node to participate in a membership protocol. In step 901, the passive node starts the routine 900 responsive to the commencement of a membership protocol by an active node. This may be achieved, for example, by the first active node to issue a Start_Membership_Interval command. This is described in detail above (i.e., step 804, FIG. 8). Preferably, the steps 900 are performed by the passive node responsive to the first Start_Membership_Interval command (described below) issued to it for the next membership protocol instance and interval by an active node.

In step 902, the membership area 612 is unlocked, enabling the active nodes to complete respective Write_Membership_Area commands. After unlocking the membership area 612, the passive node in step 903 receives "subscriptions" from the active nodes 612. Each active node's subscription preferably involves writing the active node's interval counter value, invocation countervalue, and "updated" membership view into the subscribing node's sub-portion of the membership area. As discussed below, submitting the correct counter values identifies the active node to the passive node, thereby subscribing to the passive node's membership view of the current interval. Also, writing the active node's updated membership view into the sub-portion 612a–612d is useful in later determining (as discussed in step 904, below), whether the passive node satisfies teh protocol-termination condition.

The foregoing subscriptions are preferably received in the form of Write_Membership_Area commands, issued by the active nodes. This continues until the interval is terminated, ending step 903. Namely, the interval is terminated by the first active node to experience a timeout, causing that node to issue a Truncate_Membership_Interval command, locking the membership area 612 and disabling any node's further Write_Membership_Area commands. In an alternative embodiment, illustrated above in FIG. 7, the passive node may also start a timer (step 902), and with this timer expiration also being treated as a Truncate_Membership_Interval command.

When the current interval terminates, the passive node's membership view is established by compiling a list of the subscribing active nodes from the sub-portions 612a–612d, and storing the compiled list in the passive node's view area 612e. This may be performed by the passive node itself, or alternatively, by the first active node to lock and read the passive node's membership view (i.e., step 807); in this embodiment, this active node obtains data from the membership area 612 with the Read_Membership_Area command, and uses this data to compute the passive node's membership view. Subsequently, this active node writes the computed membership view back to the passive node's view area 612e.

Thus, at the completion of step 903, the passive node's end-of-interval membership view is represented by the information in the view area 612e. Namely, the passive node's membership view includes all active nodes that successfully write the correct interval counter value and invocation counter value during the membership interval.

In step 904, the passive node determines whether, in view of the end-of-interval membership view presently stored in the view area 612e, the protocol-termination condition is met. Generally, the protocol terminates for the passive node when either (1) the passive node's end-of-interval view contains only itself, or (2) the passive node's end-of-interval view is identical to all other nodes's updated membership views received during that interval.

If the protocol fails to terminate, control passes to step 902. Otherwise, in step 905, the passive node 608 fences all active nodes outside its latest membership view, restricting their access to the passive node. In one embodiment, the passive node may prevent writes from fenced active nodes, although read operations may also be prevented if desired. After the passive node's fencing policy has been established, control passes to step 906, indicating the completion of the protocol instance.

3. Exemplary Commands For Membership Protocol Involving Super-Passive Node

To describe a more detailed implementation of the performance of membership protocols involving a super-passive node, a number of exemplary small computer system interface (SCSI) type commands are provided below. As discussed above, the membership area 612 is read-only from the end of a membership interval until another condition occurs, such as the next membership interval starting or the counter being incremented. The active nodes' ability to write to the passive node 608 is selectively enabled, or fenced out, by the results of the membership protocol. Changing the state of the passive node 608 is achieved by functions referred to as "controlled commands", and exemplified by write, mode select, format, and the like. In the illustrated embodiment, query functions, such as inquiry, sense, and mode sense, are always enabled regardless of membership or the occurrence of membership interval.

Identify_Host (Host_ID)

With this function, an active node provides the passive node 608 with its host-ID (host_ID). Preferably, each host-ID comprises an eight-byte identifier, always present in membership requests from the associated active node. If the active node has multiple attachments to the passive node 608, thus appearing as multiple SCSI initiators, the active node preferably issues this request via each attachment.

No initiator can be enabled for controlled requests until an Identify_Host request has been received from that initiator. When the passive node 608 receives an Identify_Host request, it allocates a portion of the membership area 612 to that active node, unless this has already been done because of a similar request from the same active node from another initiator.

If an Identify_Host request is received from an initiator that was previously associated with a different host-ID, then the controlled requests are immediately disabled for that initiator. Any such requests already received are executed to completion (if possible), but no new controlled commands are be accepted.

Write_Membership_Area (Area_Value)

This function allows an active node to write data into its own membership sub-portion 612a–612d. Along with the command, the requesting active node supplies the data to be written, represented by the parameter "area_value". As discussed above, this data preferably includes the active node's current invocation counter, interval countervalue and its most recent membership view. As an example, the membership area may have a default size of 120 bytes, changeable by a SCSI mode page update function.

Read_Membership_Area (Buffer_Address)

This function returns to the requesting active node the contents of all participating hosts' membership areas 612a–612d. With this command, the requesting node supplies a buffer address (buffer_address), identifying a destination address in the requesting node to store the data read from the passive node's membership area 612. The returned data may, as an example, have the format of Table 1, below.

TABLE 1

Returned Data Format

| Bytes | Content |
|-------|---------|
| 0–3 | the value of the invocation counter 611 |
| 4–7 | the value of the interval counter 650, having a default value of zero if no membership interval is currently open |
| 8–128 | the passive node's membership view, stored in the area 612e |
| 128–nn | identification of each active node participating in the current membership interval (preferably by host-ID), along with the node's membership view; this data is preferably obtained from the nodes' membership memory areas 612a–612d |

Start_Membership_Interval

This function starts a new membership interval. If a membership interval is already in progress, then no new action is taken. In response, the shared passive node 608 returns a set of information about the new interval to the requesting node. This information includes the interval's interval counter value, and may also include an indication of whether this is a new interval or one was already started. Access to the passive node 608 is not changed during the membership interval.

Truncate_Membership_Interval (Interval_ID)

This function instructs the passive node 608 to end the active membership interval. Along with the request, the requesting node identifies the desired membership interval with its interval counter value (interval_ID). If the passive node 608 includes a timer (e.g., 610), the interval ends without waiting for expiration of the timer 610. If the timer 610 is used, this function allows participating active nodes to trigger the end of the membership interval when they have determined that the protocol is complete, regardless of the timer 610. Thus, the timer 610 may be set with a lengthy expiration value, allowing for a worst case scenario, without normally having to wait for its expiration.

Arbitrating Access to Passive Node/Shared Resource Introduction

The foregoing description illustrates various techniques for performing a membership protocol in a multiprocessing system that includes a passive member. Building upon this advanced technique for completing a membership protocol, a further aspect of the invention involves a method for arbitrating access to the passive node.

Generally, after having obtained its output view with the techniques described above, the passive node "fences" active nodes outside that view. Furthermore, active nodes without the passive node in their membership views abstain from accessing to the passive node. This technique is especially useful when the passive node is a shared resource, such as a magnetic "hard" disk drive, tape drive or library, optical drive or library, etc.

Chiefly, fencing prevents fenced active nodes from writing to the passive node. As an example, however, all active node may read from the passive node 608 without impediment, regardless of membership. The passive node's fencing may, if desired, also regulate reading of data to prevent a faulty active node from errantly repeating a read operation. Also, if desired, the passive node 608 may have partitioned storage space, each partition being exclusively accessible by one active node according to separately conducted membership protocols.

Leader Nodes

Among active nodes sharing a membership view, such as the nodes 603 and 605 in FIG. 6, competition for access to the passive node 608 may be determined with many different arbitration techniques, as discussed in detail below. As one example, competition among non-fenced active nodes may be resolved using "leader nodes". A leader node is an active node designated to control access to the passive node 608.

Among active nodes sharing a common membership view that includes the passive node, the active nodes must in this embodiment decide among themselves to appoint a leader node. This may be performed by many different techniques; for example, the active nodes may sort their common membership view alphabetically, and appoint the alphabetically first active node as the leader.

In one embodiment, the non-leader active nodes then concede exclusive passive node access to the selected leader. In a different embodiment, instead of possessing exclusive access itself to the passive node, the leader node may act as controller of access to the passive node. In this embodiment, all non-leader active nodes must obtain permission from the leader to access the passive node. For this purpose, the leader may, for example, store or have exclusive access to a lock table. The leader node may implement the lock table to provide different active nodes with concurrent access to separate parts of the passive node.

Under various circumstances, there may be multiple leader nodes. This condition arises where the leaders have inconsistent views, each not including the other. Because the membership protocol of the invention guarantees asymmetric safety, only one of these otherwise competing leader nodes will enjoy access to the passive node. This is because the membership protocol of the invention, as discussed in detail above, guarantees that the passive node's membership view will only include one of the competing leader nodes. With this leader node, the passive node will share an identical membership view, in compliance with asymmetric safety. Consequently, the passive node will fence the non-included leader node from access.

As a further enhancement to this embodiment, the passive node may be provided with the capability of separately fencing active nodes from separate parts or facilities of the passive node. As an example, where the passive node is a disk drive, such parts may comprise disk partitions. In fact, a separate membership protocol may be performed for each such part of the passive node.

Operational Sequence

Figure 10:
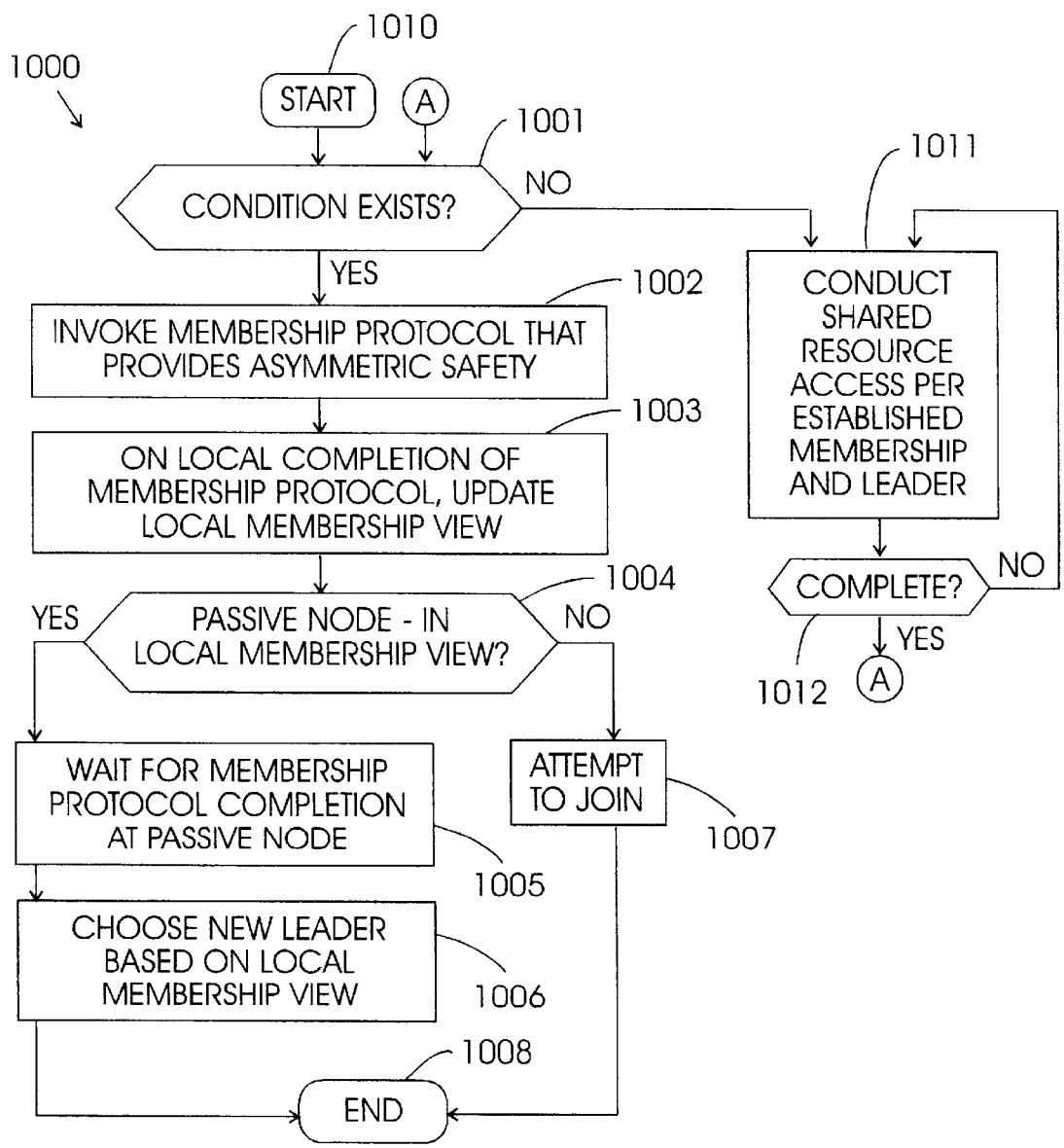
FIG. 10 is a flowchart representing a sequence for arbitrating access to a passive node in a multiprocessing system, in accordance with the invention.

The following description illustrates an operational sequence 1000 (FIG. 10) for membership arbitration in a multiprocessing system having a passive node capable of passively participating in membership protocols as discussed above. Although not necessary, the passive node may comprise a super-passive node. For ease of illustration, the sequence 1000 is illustrated using the hardware environment of FIG. 6, without any limitation intended.

The sequence 1000 is performed by each active node during ongoing operation of the system 600. In this example, the active node executing the sequence 800 is called the "executing node". After the sequence 1000 begins in step 1010, the executing node asks whether a predetermined condition exists in the system 600. This condition may comprise a number of appropriate reasons to begin a membership protocol, such as (1) suspicion of a lost leader, (2) communications failure with another node, (3) receipt of a "join request" submitted by an active node seeking to join the passive node's membership, etc.

If the condition is not met, step 1011 conducts shared resource access according to the established leader and most-recent membership protocol. This involves the passive node 608 fencing active nodes outside its established membership view, and active nodes abstaining from passive node access if the passive node is absent from their membership view. Step 1011 repeats until step 1012 finds that it has completed, whereupon control returns to step 1001.

If step 1001 finds that one of the predetermined conditions exists, however, the executing node advances to step 1002. In step 1002, the executing node in step 1002 invokes a predetermined membership protocol. Although described in the context of a multiprocessing system with multiple active nodes and one passive node, the protocol 1002 may instead be applicable to an active-node-only system. Preferably, the protocol of step 1002 provides a protocol-termination condition that guarantees asymmetric safety, as discussed above.

If a node fails to the quality for the passive node's membership view as a result of a membership protocol, step 1002 de-allocates any existing membership sub-portion 612a–612d for that active node.

Control passes to step 1003 when the invoked membership protocol completes locally. In step 1003, the executing node adopts the membership protocol's output view as the node's own membership view. Next, step 1004 determines whether the passive node (for which an available exclusive leader is being maintained) is in the executing node's new membership view. If "yes", control passes to step 1005; otherwise, control passes to step 1007.

If the node 608 actually constitutes a shared resource that is "active", step 1005 involves the executing node setting a timer and sending a message to the node 608 asking for a response when its membership protocol has completed. When the requested response is received, control passes to step 1006. If the timer expires before the requested response, then control reverts to step 1002 and a new instance of the membership protocol is invoked.

In contrast, if the node 608 is passive, step 1000 involves one of the following. In one case, the executing node may already recognize that the node 608 has completed its membership protocol (i.e., step 807, FIG. 8, discussed above). In the other case, the executing node sets a timer and repeatedly issues a Read_Membership_Area command (discussed below) to the shared resource node until (1) the executing node is notified that the shared resource has completed its membership protocol, in which case control passes to step 806, or (2) the timer expires, in which case control reverts to step 802 where a new instance of the membership protocol is invoked.

If step 1005 completes successfully, the executing node chooses a new leader node in step 1006. Step 1006 selects the new leader node based on the executing node's new membership view and the identity of the old leader. Step 1006 may utilize many different approaches, such as:

1. choosing the old leader if it is still in the executing node's new membership view, otherwise, choose the first of the non-shared nodes.
2. choosing the old leader if it is still in the membership view, otherwise, choosing the lexicographically next member in the membership view after the old member.
3. choosing the lexicographically first regular member in the membership view.
4. choosing the lexicographically next member in the membership view after the old leader.
5. choosing choose the new leader according to one of the foregoing techniques, but with lexicographic ordering replaced by any predetermined total ordering of regular node IDs.

In contrast to steps 1005–1006, step 1007 is performed if the passive node 608, for which an available exclusive leader is being maintained, is not in the executing node's new membership view. Step 1107 involves the executing node initiating an attempt to join the passive node's membership view.

Figure 11:
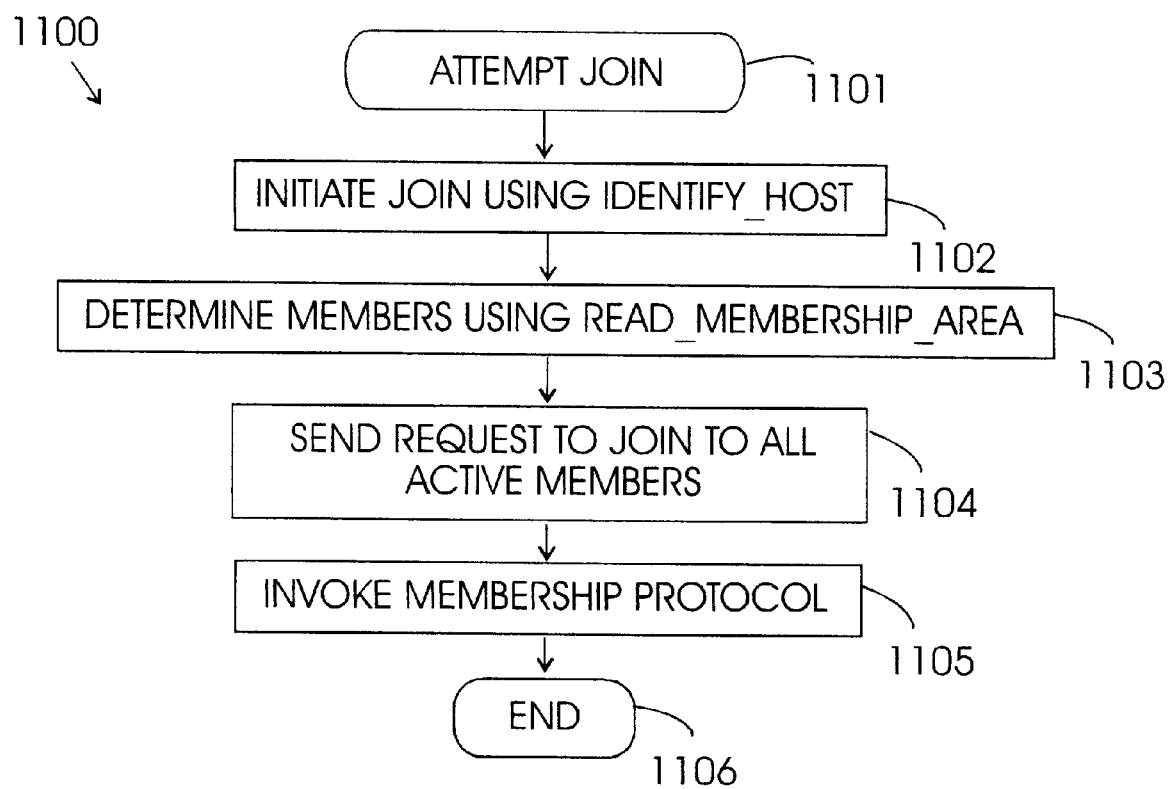
FIG. 11 is a flowchart of an operational sequence performed by an active node attempting to join a membership group with one passive node, in accordance with the invention.

The join attempt is performed as depicted by the sequence 1100 (FIG. 11), described as follows. Namely, after the sequence 1100 begins in step 1101, the executing node in step 1102 initiates the join. Preferably, this is achieved by the executing node issuing an Identify_Host command (described below) to arrange for itself an allocation of a membership sub-portion 612a–612d in the passive node's membership area 612.

In step 1103, the executing node reads the membership area 612 to determine which active nodes have initialized membership sub-portions 612a–612d, the current invocation counter value, and interval counter value. This may be performed, for instance, using the Read_Membership_Area command. The active node waits until the current interval counter value read by this method is zero, indicating no membership protocol in progress.

In step 1104, the active node sends a join request to each other active node in its membership view. Then, the executing nodes invokes a membership protocol, using the incrementally next invocation value in step 1105. This completes the join protocol for the executing node, and control passes to step 1106 to indicate this completion.

Responsive to a request to join message, an active node adds the identity of the requester to a set of node IDs waiting to join. On the next invocation of the membership protocol, the set of nodes waiting to join are added to the current membership view to produce the membership view input to the protocol.

In an alternative embodiment, if the shared resource is an active rather than passive node, then step 1007 involves the executing node's performance of a normal attempt to join a membership group, e.g., by sending a request to each member to join and then invoking the membership protocol.

Referring again to FIG. 10, after the completion of steps 1006 or 1007, step 1008 completes the sequence 1000.

OTHER EMBODIMENTS

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method of determining access among multiple active nodes to a passive node in a multiprocessing system, the system including a communications network interconnecting the passive node and the active nodes, the method comprising:

a first node of the active nodes transmitting a predetermined invocation message to all other active nodes;

each of the active nodes receiving the invocation message, in response thereto, conducting a predetermined membership protocol including one or more intervals in which each active node initiates an exchange of membership views with the active nodes, each active node initiates acquisition of a membership view from the passive node, and each active node submits a subscription to the passive node, where each active node repeatedly updating its membership view between intervals and performing a new interval until the active node's membership view satisfies a predetermined protocol-termination condition guaranteeing asymmetric safety among the active nodes.

2. The method of claim 1, the method further including:

the passive node receiving subscriptions and storing the received subscriptions;

the passive node rejecting any subscriptions received outside a membership protocol interval conducted at the passive node.

3. The method of claim 1, the active node sending a subscription to the passive node comprising:

the active node sending the passive node a signal to identify the active node.

4. The method of claim 1, the method further comprising:

responsive to receiving the invocation message, a first node starting a timer, the interval-termination condition for the first node comprising the expiration of the timer.

5. The method of claim 1, further comprising:

responsive to receiving the invocation message, said first ode starting a timer, the interval-termination condition for the first node comprising the expiration of the timer.

6. The method of claim 5, the first node being the passive node.

7. The method of claim 1, the method further comprising:
responsive to receiving the invocation message, multiple active nodes independently starting respective timers, the interval-termination condition at the passive node comprising a first expiration of one of the timers.

8. The method of claim 1, the method further comprising:
the passive node computing its own membership view based upon contents of the subscriptions received from the active nodes.

9. The method of claim 1, the method further comprising:
one of the active nodes computing the passive node's membership view based upon contents of the subscriptions received by the passive node from the active nodes.

10. The method of claim 1, further comprising the passive node arbitrating access among the active nodes to the passive node by fencing active nodes outside the passive node's membership view.

11. The method of claim 10, further comprising each active nodes without the passive node in its membership view abstaining from attempts to write data to the passive node.

12. The method of claim 10, further comprising the active nodes without the passive node in their membership views abstaining from attempts to access the passive node.

13. The method of claim 1, the passive node comprising a data storage device.

14. A multiprocessing system, comprising:
multiple active nodes;
a passive node; and
a communications network interconnecting the passive node and one or more of the active nodes;
wherein the active nodes are programmed to perform a method for determining access among the active nodes to the passive node,
a first node of the active nodes transmitting a predetermined invocation message to all other active nodes;
each of the active nodes receiving the invocation message, in response thereto, conducting a predetermined membership protocol including one or more intervals in which each active node initiates an exchange of membership views with the active nodes, each active node initiates acquisition of a membership view from the passive node, and each active node submits a subscription to the passive node, where each active node repeatedly updating its membership view between intervals and performing a new interval until the node's membership view satisfies a predetermined protocol-termination condition guaranteeing asymmetric safety among the active nodes.

15. The apparatus of claim 14,
the passive node receiving subscriptions and storing the received subscriptions;
the passive node rejecting any subscriptions received outside a membership protocol interval conducted at the passive node.

16. The apparatus of claim 14, the active node sending a subscription to the passive node comprising:
the active node sending the passive node a signal to identify the active node.

17. The apparatus of claim 16, the active node sending the passive node a signal to identify the active node comprising:
the active node writing the active node's membership view to a membership area in the passive node, the membership area being exclusively associated with the active node.

18. The apparatus of claim 14, responsive to receiving the invocation message, a first node starting a timer, the interval-termination condition for the first node comprising the expiration of the timer.

19. The apparatus of claim 18, the first node being the passive node.

20. The apparatus of claim 14, responsive to receiving the invocation message, multiple active nodes independently starting respective timers, the interval-termination condition at the passive node comprising a first expiration of one of the timers.

21. The apparatus of claim 14, the passive node computing its own membership view based upon contents of the subscriptions received from the active nodes.

22. The apparatus of claim 14, one of the active nodes computing the passive node's membership view based upon contents of the subscriptions received by the passive node from the active nodes.

23. The apparatus of claim 14, further comprising the passive node arbitrating access among the active nodes to the passive node by fencing active nodes outside the passive node's membership view.

24. The apparatus of claim 23, further comprising each active nodes without the passive node in its membership view abstaining from attempts to write data to the passive node.

25. The apparatus of claim 23, further comprising the active nodes without the passive node in their membership views abstaining from attempts to access the passive node.

26. The apparatus of claim 14, the passive node comprising a data storage device.

* * * * *